Feb. 27, 1962     I. G. PILSKÄR     3,022,805
METHOD OF FASTENING WIRE TO A SOLDERING TAG
Filed Nov. 8, 1957

INVENTOR
INGE GUNNAR PILSKÄR
BY Hane and Nydick
ATTORNEYS

United States Patent Office 3,022,805
Patented Feb. 27, 1962

3,022,805
METHOD OF FASTENING WIRE TO A SOLDERING TAG
Inge Gunnar Pilskär, Enskede, Sweden, assignor to Telefonaktiebolaget L M Ericsson, Stockholm, Sweden, a corporation of Sweden
Filed Nov. 8, 1957, Ser. No. 695,388
Claims priority, application Sweden Dec. 6, 1956
1 Claim. (Cl. 140—93)

The present invention refers to a method of fastening one or more metallic wires to a soldering tag to retain the same during soldering.

A wire is usually fastened to a soldering tag in such a way that one end of the wire is inserted in an opening in the end of the tag about which the wire is bent to hold it during soldering. This known method necessitates at least two operations, one of them consisting of inserting the wire in the opening and another of bending the wire by means of a plier or similar tool. An object of the invention is to simplify fastening of the wire and to provide a method which is more rapid and more economical in use than known methods and which makes it possible to mechanize the fastening operation.

The inventive method of fastening a wire to a soldering tag having an outer bending edge and an opening spaced inwardly therefrom resides in placing the wire to be fastened upon the bending edge with the free end of the wire extending outwardly beyond the bending edge a distance not greater than the distance between said bending edge and the innermost extremity of said opening, exposing the two wire portions extending on opposite sides of said bending edge to an inwardly directed pressure force from a pressure tool so as to press each of said wire portions at the same time against a respective tag surface along a section of the wire, and thereafter pressingly sliding the respective legs of said pressure tool along the wire on each tag surface toward said opening to press successive wire sections against the tag surface until passing the outermost edge of the opening, so as to subject the wire section of each wire portion adjacent said edge to a deformation.

Figure 1:
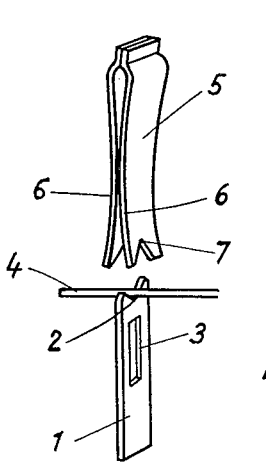
Figure 2:
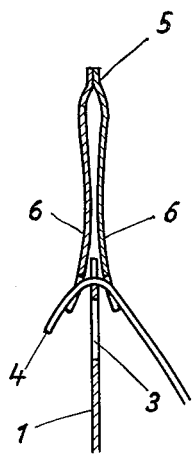
Figure 3:
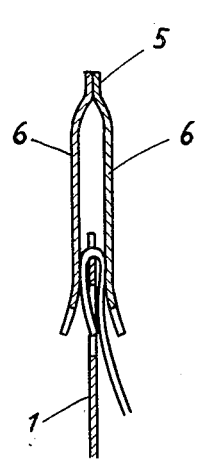

The invention will now be described in connection with the accompanying drawing of which FIGS. 1-3 show different steps during a wire-fastening operation.

A soldering tag 1 is at its end edge provided with a V-shaped notch or indentation 2 forming a bending edge and adjacent to this notch a longitudinally extending opening 3 is located. As shown in FIG. 1 the wire 4 to be clamped to the soldering tag is put on the indentation 2 in such a way that the free end of the wire does not extend further from the indentation than the distance between the lowermost point of the indentation 2 and the furthermost edge of the opening 3. A plier-shaped tool 5 the branches of which consist of a pair of plate springs 6 resting against each other adjacent to their free ends is urged against the end of the wire located in the indentation 2. The end parts of the springs are bent outwardly so that the soldering tag with its end portion may separate the springs when the tool is pushed into the tag. The end portions of the spring are each provided with indentations 7 by means of which the wire is properly positioned on the tag during clamping operation. As shown in FIG. 2 the springs 6 cause the wire 4 to be bent while the springs are being separated, the wire thus being clamped on the tag between the springs during the continued movement of the springs along the tag. In FIG. 3 the soldering tag and the wire are shown after completion of the bending operation. As shown in FIG. 3 that the wire 4 has been bent in such a way that the free end of the wire is inserted in the opening 3 and that the remaining deformation is great enough to secure the wire to the tag during the soldering operation. It is important that the distance between the bending edge 2 and the respective rim of opening 3 is such that the radius of the bending curvature effects a permanent deformation. If said distance exceeds a predetermined value, this predetermined value being about five and a half times the diameter of the wire, an elastic deformation only is obtained and the end of the wire is not fixed permanently to the tag part between the bending edge and the opening. However it is necessary that said tag part has a certain minimum length to ensure that the friction between the folded end of the wire and the tag is high enough to keep the wire steady in relation to the soldering tag.

The bending edge need not be formed by an end portion of the soldering tag, but said tag may as well be provided with a pair of openings, one opening then serving as a bending edge, on folding the end of the wire around the tag part between the two openings.

The invention makes it possible to minimize the quantity of heat conducted from the joint, through the soldering tag, by means of a suitable size and shape of the opening 3. Considering that the wedge-shaped indentation 2 is able to hold the wire, the opening may have the desired width and length within the limitation, which from a strength point of view is determined by the dimensions of the wire portions on either side of the opening. Thus the quantity of the heat led away is determined by the cross section of the wire portions located on either side, this cross section being dependent on the width and length of the opening. By a low dissipation of heat, heat is not conducted to the base of the tag but can effectively be used, this e.g. eliminating the risk of damaging plastic insulation of wires during soldering.

I claim:

A method of fastening a wire to a soldering tag having an outer bending edge and an opening spaced inwardly therefrom, said method comprising the steps of: placing the wire to be fastened upon said bending edge with the free end of said wire extending outwardly beyond said bending edge a distance not greater than the distance between said bending edge and the innermost extremity of said opening, exposing the two wire portions extending on opposite sides of said bending edge to an inwardly directed pressure force from a pressure tool so as to press each of said wire portions at the same time against a respective tag surface along a section of the wire, and thereafter pressingly sliding the respective legs of said pressure tool along the wire on each tag surface toward said opening to press successive wire sections against the tag surface until passing the outermost edge of the opening so as to subject the wire section of each wire portion adjacent to said edge to a deformation.

References Cited in the file of this patent

UNITED STATES PATENTS

| | | |
|---|---|---|
| 444,403 | Tiffany | Jan. 6, 1891 |
| 454,830 | Langill | June 23, 1891 |
| 470,957 | Tiffany | Mar. 15, 1892 |

(Other references on following page)

UNITED STATES PATENTS

| | | |
|---|---|---|
| 925,531 | Tiffany | June 22, 1909 |
| 1,156,763 | Doran | Oct. 12, 1915 |
| 1,181,284 | Bates | May 2, 1916 |
| 1,506,612 | Buschardt | Aug. 26, 1924 |
| 1,526,716 | Neuberz | Feb. 17, 1925 |
| 1,814,436 | DeSaussure | July 14, 1931 |
| 1,826,580 | Spinney | Oct. 6, 1931 |
| 2,094,984 | Hiering | Oct. 5, 1937 |
| 2,252,384 | Marsh | Aug. 12, 1941 |
| 2,276,086 | Peregallo | Mar. 10, 1942 |
| 2,298,705 | Kohnle | Oct. 13, 1942 |
| 2,487,057 | Kohring | Nov. 8, 1949 |
| 2,540,160 | Berg | Feb. 6, 1951 |
| 2,572,643 | Maull | Oct. 23, 1951 |
| 2,604,137 | Nase | July 22, 1952 |
| 2,761,209 | Fisher | Sept. 4, 1956 |
| 2,837,136 | Legat | June 3, 1958 |